United States Patent
Saraswat et al.

(10) Patent No.: US 7,275,217 B2
(45) Date of Patent: Sep. 25, 2007

(54) SYSTEM AND METHOD FOR MULTI-MODAL BROWSING WITH INTEGRATED UPDATE FEATURE

(76) Inventors: Vijay Anand Saraswat, 208 Morris Ave., Mountain Lakes, NJ (US) 07046; VijayaBalaji Prasanna Uppaladadium, B-1101, Komaria Brigade Residency, Chikkalusandra, Uttarahalli Main Road, Bangalore - 560061 (IN); Rohitashva Mathur, 7-Ka-13, Jawahar Nagar, Jaipur 302004 (IN); Shirish Vaidya, 2300 Rachel Ter. #14, Pine Brook, NJ (US) 07058

( * ) Notice: Subject to any disclaimer, the term of this patent is extended or adjusted under 35 U.S.C. 154(b) by 638 days.

(21) Appl. No.: 10/658,362

(22) Filed: Sep. 8, 2003

(65) Prior Publication Data

US 2004/0104938 A1 Jun. 3, 2004

Related U.S. Application Data

(60) Provisional application No. 60/409,448, filed on Sep. 9, 2002.

(51) Int. Cl.
*G06F 3/048* (2006.01)
*G06F 3/01* (2006.01)
(52) U.S. Cl. .................. 715/764; 379/207.02; 709/203; 709/205
(58) Field of Classification Search ........... 379/207.02; 709/203, 205; 715/764
See application file for complete search history.

(56) References Cited

U.S. PATENT DOCUMENTS 6,124,879 A 9/2000 Lee ............................ 348/14
6,430,624 B1 * 8/2002 Jamtgaard et al. .......... 709/246
6,523,062 B1 * 2/2003 Bridgman et al. .......... 709/203
6,594,697 B1 * 7/2003 Praitis et al. ............... 709/225

(Continued)

FOREIGN PATENT DOCUMENTS

DE  010125406 A1  1/2002
JP  408069245      3/1996

(Continued)

OTHER PUBLICATIONS http://www.w3schools.com/wap/wml_format.asp.*

(Continued)

*Primary Examiner*—Weilun Lo
*Assistant Examiner*—Steven B Theriault
(74) *Attorney, Agent, or Firm*—Ash Tankha; Counsel, Lipton, Weinberger & Husick (57) ABSTRACT

A technique for enabling a browser to update its state upon a change between voice and visual mode. A deck of visual content cards is loaded into a visual browser, wherein one card contains a link to change from visual to voice mode. Selecting the link directs the visual browser to an update card, which has a first event handler which enters voice mode by placing a voice call to a telephone number in response to forward entry into the update card. The update card also includes a second event handler which contacts an update site to determine what content to point the visual browser to when visual mode resumes. In a first embodiment, the second event handler is actuated by backward entry into the update card upon completion of the voice call. In a second embodiment, the second event handler is actuated by expiration of a timer.

15 Claims, 5 Drawing Sheets

U.S. PATENT DOCUMENTS

| | | | |
|---|---|---|---|
| 6,684,088 B1* | 1/2004 | Halahmi | 455/566 |
| 6,727,916 B1* | 4/2004 | Ballard | 715/758 |
| 6,744,753 B2* | 6/2004 | Heinonen et al. | 370/338 |
| 6,865,404 B1* | 3/2005 | Tikkala et al. | 455/566 |
| 6,920,425 B1* | 7/2005 | Will et al. | 704/275 |
| 6,937,588 B2* | 8/2005 | Park | 370/338 |
| 6,985,754 B1* | 1/2006 | Pedersen et al. | 455/556.2 |
| 6,996,800 B2* | 2/2006 | Lucassen et al. | 717/106 |
| 7,028,306 B2* | 4/2006 | Boloker et al. | 719/310 |
| 7,032,169 B2* | 4/2006 | Ativanichayaphong et al. | 715/501.1 |
| 7,050,905 B2* | 5/2006 | Nemeth | 701/201 |
| 7,062,491 B2* | 6/2006 | McNulty et al. | 707/10 |
| 7,146,407 B2* | 12/2006 | McNulty et al. | 709/217 |
| 2001/0032234 A1 | 10/2001 | Summers et al. | 709/201 |
| 2001/0047258 A1* | 11/2001 | Rodrigo | 704/256 |
| 2002/0001295 A1* | 1/2002 | Park | 370/338 |
| 2002/0156864 A1* | 10/2002 | Kniest | 709/217 |
| 2002/0198719 A1* | 12/2002 | Gergic et al. | 704/270.1 |
| 2003/0023953 A1* | 1/2003 | Lucassen et al. | 717/106 |
| 2003/0046316 A1* | 3/2003 | Gergic et al. | 707/513 |
| 2003/0063728 A1* | 4/2003 | Sibal et al. | 379/207.02 |
| 2003/0109247 A1* | 6/2003 | Lindgren et al. | 455/412 |
| 2003/0130854 A1* | 7/2003 | Galanes et al. | 704/277 |
| 2003/0167172 A1* | 9/2003 | Johnson et al. | 704/270.1 |
| 2003/0171925 A1* | 9/2003 | Werner | 704/270.1 |
| 2003/0182366 A1* | 9/2003 | Baker et al. | 709/203 |
| 2004/0202132 A1* | 10/2004 | Heinonen et al. | 370/331 |
| 2004/0208167 A1* | 10/2004 | Kishida | 370/352 |
| 2004/0237109 A1* | 11/2004 | Laitinen et al. | 725/62 |
| 2005/0273759 A1* | 12/2005 | Lucassen et al. | 717/105 |
| 2006/0168095 A1* | 7/2006 | Sharma et al. | 709/217 |
| 2006/0218230 A1* | 9/2006 | McNulty et al. | 709/203 |

OTHER PUBLICATIONS

Microsoft Computer Dictionary 5th Edition, p. 259, 542.*
W3C.org et al. "Device Independent Principles" Sep. 2003.*
XMI Coverpages.org et al. "WAP Wireless Markup Language Specification (WML)" Aug. 2001.*
http://www.w3schools.com/wap/wml_format.asp Dec. 2002 http://web.archive.org/web/20020124032453/http://www.w3schools.com/wap/wml_format.asp.*
Mircosoft Computer Dictionary 5th Edition, p. 259, 542 May 2002.*

* cited by examiner

FIG. 6

SYSTEM AND METHOD FOR MULTI-MODAL BROWSING WITH INTEGRATED UPDATE FEATURE

CROSS-REFERENCE TO RELATED CASES

This application claims the benefit of U.S. Provisional Application No. 60/409,448, entitled "System and method for Multi-Modal Browsing with Integrated Update Feature," filed Sep. 9, 2002.

FIELD OF THE INVENTION

The present invention relates generally to the field of multi-modal telephony. In particular, the invention provides a technique for initiating an action (such as browser synchronization or state update) at the time of a mode swap, without requiring the user to initiate the action explicitly. The technique of the present invention is adaptable to existing markup languages, such as Wireless Markup Language (WML), which provide no explicit support for initiating an action at the time of a mode swap.

BACKGROUND OF THE INVENTION

Multimodality is concerned with allowing customers to use communications devices, such as wireless telephones, to interact with applications in an integrated fashion using both voice and visual means. A significant technical impediment in the development of multimodality is that many current wireless devices, such as 2G and 2.5G cell phones are capable of supporting only one mode or channel at a time. For instance, if the customer is interacting through the voice channel (typically, by placing a phone call, either to a human or a computationally-enabled agent), he is typically unable to interact through a visual channel (e.g., he is typically unable to click on the visual display and receive a new browser page, interact with it, send new requests into the network, etc).

One idea used to circumvent this problem is swapping multimodality. Swapping multi-modality refers to the sequential (rather than concurrent) use of voice and visual modes—i.e., the communication can change back and forth between visual and voice modes, but cannot use both at the same time. Implementations of swapping multimodality, however, must solve a fundamental problem: when the user is interacting in the voice mode, and wishes to transfer to visual mode, a means must be found by which the visual mode automatically and transparently displays the current "state" of the user's interaction with the application. For example, suppose that equivalent content is available in both Voice eXtensible Markup Language (VoiceXML) and Wireless Markup Language (WML). If the user is browsing VoiceXML pages on a voice browser and then switches to visual mode, in order to make the swap appear "seamless" to the user it should be possible to point the visual browser to a card in the WML deck that is equivalent to the VoiceXML page that the user last saw when the swap to visual mode occurred. In order to accomplish this results, however, it must be possible to tell the visual browser which card to point to at the time the mode swap occurs.

The present invention provides a technique for furnishing this state information to a browser, and overcomes drawbacks present in the prior art.

SUMMARY OF THE INVENTION

The present invention provides a technique whereby a user may navigate content in voice and visual modes and may change between these modes, such that a change in mode updates the state of the current browser without the user having to explicitly request such an update. Thus, if a user is navigating voice (e.g., VoiceXML) pages using a voice browser and changes to visual mode, the mode change causes the visual browser to receive "update" information that allows the visual browser to be pointed to a visual (e.g., WML) card equivalent to the one the user was navigating at the time of the mode change.

When a deck of visual (e.g., WML) cards is downloaded to the user, one or more of the cards may include a link that allows the user to change to voice mode. In accordance with the invention, the link does not directly place the voice call, but rather directs the user to a special card in the deck called an "update" card. The update card has two event handlers. The first event handler is activated upon forward entry into the update card, and that event handler initiates a voice call to a specified number. The second event handler—which is intended to be invoked after the voice call is complete—is activated in response to a type of event discussed below. This second event handler contacts an "update" site, which informs (or "updates") the visual browser as to what content it should point to following the voice session. Thus, if the user changes to voice mode and then navigates to a different web site, then upon the user's return to visual mode the update server can inform the visual browser that the current site has changed so that the visual browser can be pointed to that new site (or, to a particular card on the site, a particular field on the card, etc., depending upon the granularity of the update information).

As noted above, the contact to the update site is initiated by the second event handler after completion of the voice call. In order to cause the contact to the update site to follow completion of the voice call, the second event handler may be configured to respond to one of two different types of events. In a first embodiment of the invention, the second event handler is invoked upon a backward entry into the update card. In a second embodiment of the invention, the second event handler is invoked upon expiration of a timer that is initialized by the first event handler. As discussed below in the detailed description of the invention, the first embodiment is appropriate for visual browsers that reenter the update card backward when the voice call is complete, and the second embodiment is appropriate for browsers that reenter the update card backward as soon as a new thread has been spawned to place a voice call.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Multi-modal communication allows a user to interact with content in more than one mode. For example, a user may use a wireless telephone to interact with content in both voice and visual modes. Since many devices do not allow the use of both modes at the same time, multi-modality often requires serial swapping from one mode to another. In order for the multi-modal experience to appear seamless to the user, when a mode swap occurs (e.g., from voice to visual mode) the new browser (e.g., the visual browser) should be pointed to content in visual mode that is equivalent to the content the user was browsing in voice mode. For example, if the user navigates to a particular VoiceXML page in voice mode and then switches to visual mode, the user should be pointed to an equivalent WML card so that the user feels that he is continuing where he left off, thereby making the mode swap a more "seamless" experience. The present invention provides a technique that allows one browser to be "updated" to the state of another, without the user having to explicitly request such an update. As an alternative to the use of an update card another method for providing updated visual information is WAP Push. WAP Push is a standard method that can be implemented directly by the update server, without the use of update cards, if the network to which the browser is connected supports the WAP Push standard.

Environment for Multi-Modal Telephonic Communications

Figure 1:
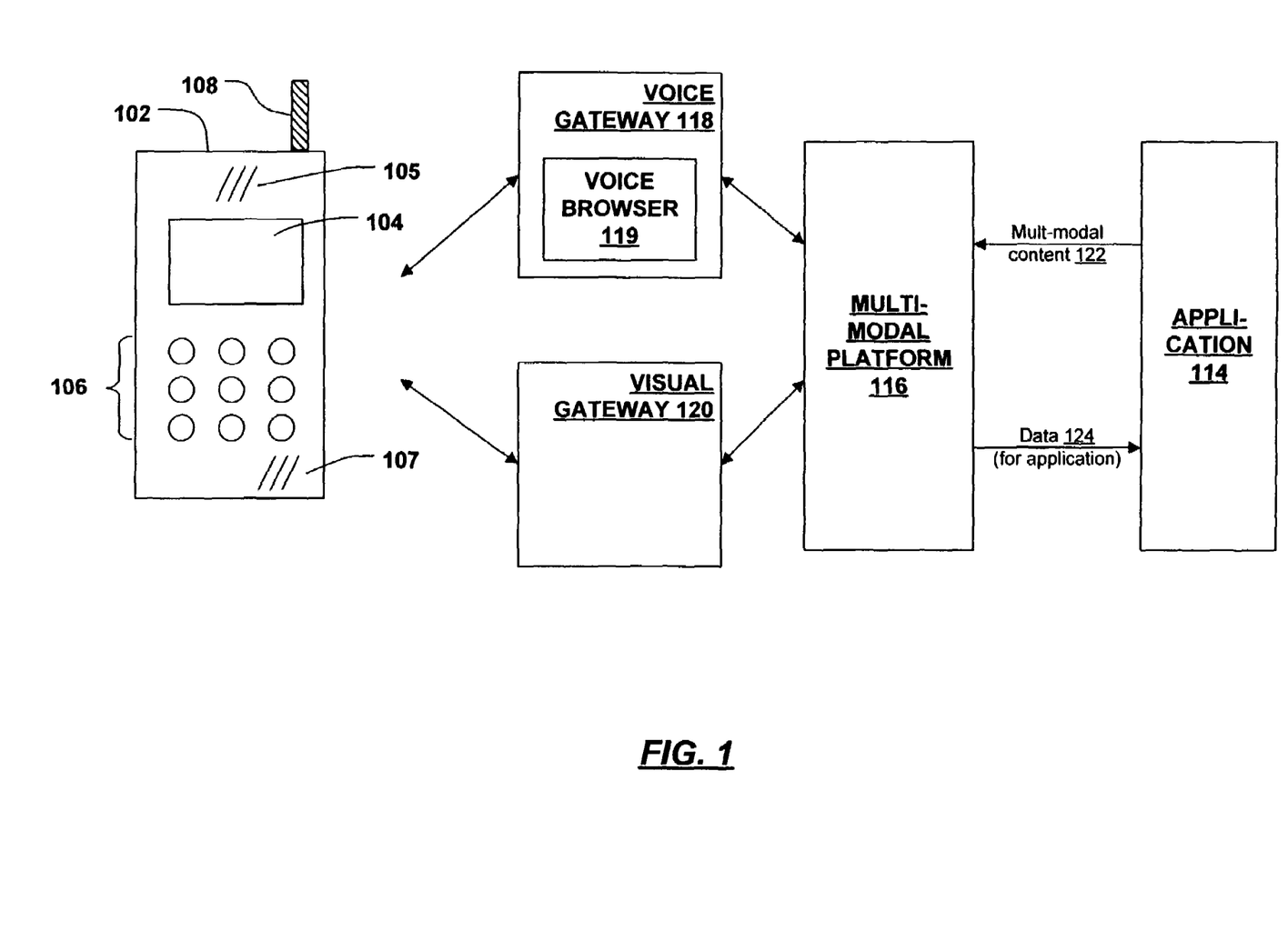
FIG. 1 is a block diagram of an environment that supports multi-modal telephonic communications.

FIG. 1 shows an exemplary environment 100 in which multi-modal communication may take place. Environment 100 includes a wireless telephone 102, an application 114, a multi-modal platform 116, a voice gateway 118, and a visual gateway 120. The elements of exemplary environment 100 are described below. It will be understood that the components shown in FIG. 1 are merely exemplary; multi-modal communication may take place in other environments having components different from those shown in FIG. 1.

In a preferred embodiment, wireless telephone 102 comprises a visual display 104, an audio speaker 105, a keypad 106, a microphone 107, and an antenna 108. Visual display 104 may, for example, be a Liquid Crystal Display (LCD) that displays text and graphics. Audio speaker 105 renders audio signals (e.g., signals received from other components in environment 100) in order to produce audible sound. Keypad 106 may be an alpha-numeric keypad that allows a user to input alpha-numeric characters. Depending on the context in which keypad 106 is being used, wireless telephone 102 may respond to input from keypad 106 by displaying appropriate characters on display 104, transmitting ASCII representations of such characters, or (in the case of numeric input) generating appropriate Dual Tone Multi-Frequency (DTMF) signals. Microphone 107 captures audio signals, which may, in one example, be digitally sampled by wireless telephone 102 for wireless transmission to other components of network architecture 100. Antenna 108 is used by wireless telephone 102 to transmit information to, and receive information from, components within architecture 100. For example, wireless telephone 102 may use antenna 108 to receive digital audio signals for rendering on speaker 105, to transmit digital audio signals captured by microphone 107, to receive data to be displayed on visual display 104, or to transmit data captured by keypad 106. Wireless telephone 102 may also contain computing components (not shown). For example, wireless telephone 102 may have a memory and a processor, which may be used to store and execute software (e.g., software that digitally samples audio signals captured with microphone 107, software that generates analog audio signals from digitally-sampled audio received through antenna 108, a WAP browser that enables the browsing of content using visual display 104 and keypad 106, etc.). The structure of a wireless telephone 102 that employs the components shown in FIG. 1 in connection with a memory and processor will be apparent to those of skill in the art, and thus is not discussed at length herein.

One feature of wireless telephone 102 is that it can be viewed as having two different "modes" of communication. On the one hand, wireless telephone 102 communicates in a "voice" mode; on the other hand, wireless telephone 102 communicates in a data (or "visual") mode. In voice mode, wireless telephone uses microphone 107 to capture audio (which may be digitally sampled and then transmitted through antenna 108), and uses speaker 105 to render audio (which may be received through antenna 108 in a digital form). "Voice" mode is exemplified by the conventional usage of a telephone in which a first party uses the telephone to engage in two-way speech with a second party. In "visual" mode, wireless telephone uses keypad 106 to capture data (e.g., alpha-numeric data which may be represented in ASCII form), and uses visual display 104 to render data. The captured data may be transmitted through antenna 108, and antenna 108 may also be used to receive the data that is to be displayed on visual display 104. A typical wireless telephone 102 can communicate only in one of these modes at a single time (although some more advanced wireless telephones are capable of communicating in two modes at once).

It will be understood that wireless telephone 102 is merely an example of a device that can participate in multi-modal communications. A wireless telephone is a preferred example of such a device, since wireless telephones typically support both voice communications and a WAP browser. However, the invention does not require that multi-modal communications occur with a wireless telephone, or even that such communications occur wirelessly.

Application 114 is preferably a software application that generates content 122 to be sent to wireless telephone 102, and responds to information (e.g., data 124) received from wireless telephone 102. For example, application 102 may be an airline reservation system that generates menus for rendering on wireless telephone 102, and takes some action based on user responses that are submitted through wireless telephone 102.

In a preferred embodiment, application 114 generates content in a manner that is "agnostic" to the mode in which a user will interact with the content. For example, an airline reservation system can generate a menu (e.g., 1 for domestic reservations, 2 for international reservations, etc.), without concern as to how menu will be rendered to the user, and without concern as to how the user will select an option from the menu. Thus, the same menu can be used in voice mode (e.g., "Say 1 for domestic reservations, say 2 for domestic reservations, . . . "), or in visual mode (e.g., displaying the lines "1. International Reservations" and "2. Domestic Reservations" on display 104, and lets the user select one of the options using keypad 106). Thus, application 114 provides this "mode-agnostic" multi-modal content 122 to a multi-modal platform 116, and multi-modal platform 116 negotiates the details of using multi-modal content 122 to create either visually-renderable content or voice-renderable content. For example, multi-modal platform may include logic that converts multi-modal content 122 into Voice eXtensible Markup Language (VoiceXML) for use in voice mode, and that also converts the same content into Wireless Markup Language (WML) for use in visual mode. Or, multi-modal content 122 may contain both VoiceXML and WML together, in which case multi-modal platform 116 passes along either the VoiceXML or WML content to the appropriate gateway, depending on which mode is presently being used. These are just some of the possible ways to provide multi-modal content.

In addition to generating content, application 114 preferably also receives input data 124 through multi-modal platform 116. For example, when a user interacts with the content (e.g., selects domestic reservations from the menu), multi-modal platform provides data 124 indicative of that user response.

Multi-modal platform 116 may use a voice gateway 118 and a visual gateway 120 to communicate with wireless telephone 102. As discussed above, multi-modal platform may convert multi-modal content 122 into WML; in this case, the WML may be provided to wireless telephone 102 through visual gateway 120. As also discussed above, multi-modal platform may convert multi-modal content 122 into VoiceXML; in this case, the VoiceXML may be provided to voice gateway 118. Voice gateway 118 may include a voice browser 119; voice browser generates audio (e.g., speech, music, etc.) based on VoiceXML content, and receives audio responses to voice content. Thus, when wireless telephone 102 is acting in voice mode, it may simply engage in an ordinary voice call with voice gateway 118, in which case wireless telephone renders (through speaker 105) the audio generated by voice browser, and provides voice browser with user-generated audio (either audio captured with microphone 107, or dual-tone multi-frequency (DTMF) signals generated with keypad 106). In contrast to voice browser 119, the visual browser (e.g., a WAP browser) typically resides on wireless telephone 102; thus, visual gateway 120 simply passes along WML content to wireless telephone 102 so that the WML content may be rendered by such browser.

It should be noted that multi-modal platform 116 may maintain "state" information. That is, if the user navigates to a particular page (or a particular card, or a particular portion of a card), the multi-modal platform may maintain this information. As discussed below, this information may be used in case the user changes mode. That is, if the user is browsing in one (e.g., voice) mode and changes to another (e.g., visual) mode, this state information may be used to point the new browser (e.g., the visual browser, in the case of a voice-to-visual swap) to the same point in the content that the user was browsing in the old browser at the time of the mode swap.

Exemplary Content Page

Figure 2:
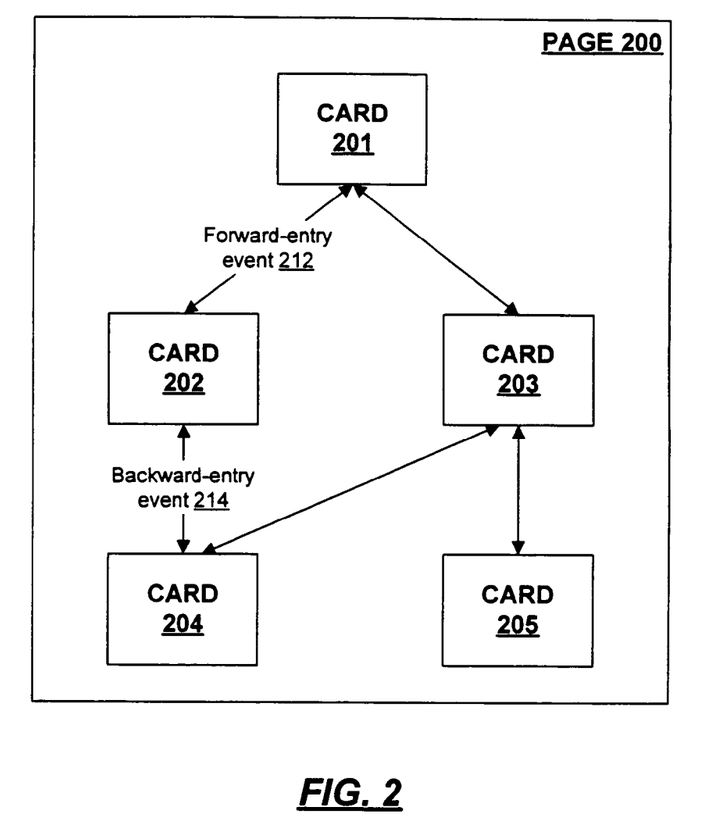
FIG. 2 is a block diagram of an exemplary page of content, organized into cards.

FIG. 2 shows an exemplary page 200 of content. Exemplary page 200 comprises a plurality of cards 201-205. Cards 201-205 are structured such that the user can "flip" through the cards in an order that is partly constrained by fixed relationships between the cards, but also takes into account user input. For example, when page 200 loads, the user may initially be directed to top-level card 201. Card 201 may give the user a choice (e.g., "Do you want domestic reservations or international reservations?"). Depending on the user's choice, the user may be led to either card 202 or 203. Card 202 always leads to card 204. Card 203—like card 201—may present the user with a choice, and leads either to card 204 or to card 205 depending on that choice. Various markup languages support the notion of pages organized into a structured "deck" of cards. WML is an example of such a language.

One concept in the "card" model is that a card can be entered either "forward" or "backward." Thus, as a user navigates from card 201 to card 202, this is considered a "forward" entry into card 202. On the other hand, as the user navigates from card 204 to 202, this is considered a "backward" entry into card 202. WML supports the notion that forward and backward entry into cards are different types of events, and separate event handlers can be defined for these events. Thus, when a user navigates from card 201 to card 202, this navigation generates an "enter-forward" event 212, and card 202 can define a particular action to be taken upon the happening of such an event. Similarly, when the user navigates from card 204 to card 202, this navigation generates an "enter-backward" event 214, and card 202 can define a particular action to be taken upon the backward entry into card 202.

Figure 3:
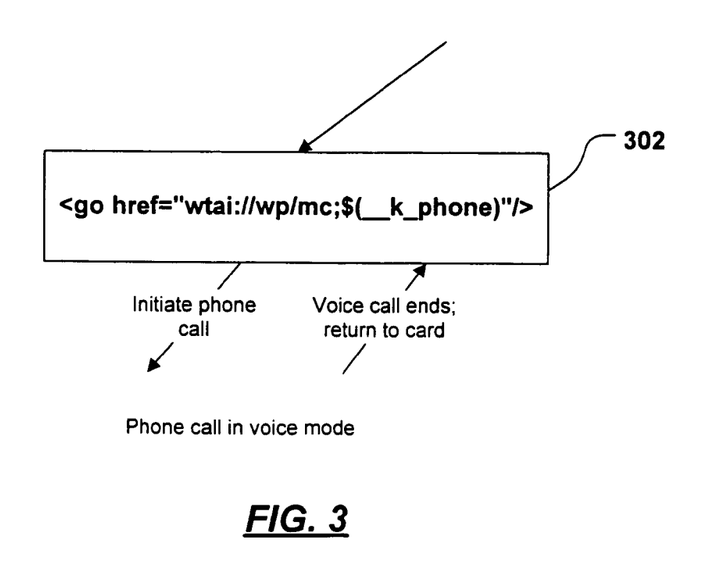
FIG. 3 is a block diagram of an exemplary card, showing the use of a request contained in the card to place a voice call.

FIG. 3 shows a special case of the forward/backward entry concept, which is relevant to the invention for reasons discussed below. In WML, one of the actions that may be specified in a card is to place a phone call. In card 302, this action is represented by the instruction "wtai://wp/mc;$ (_k_phone)", which causes wireless telephone 102 to place a phone call to the number specified in the tag named "_k_phone". When a phone call is placed, as specified by the instruction, the initiation of the phone call is considered a movement out of card 302. Conversely, when the phone call ends (or, in some implementations of WAP browsers, when a new thread is spawned to place the phone call), card 302 is reentered. This re-entry of card 302 is considered a backward entry, and this backward entry triggers an "enter-backward" event. As discussed below, one embodiment of the invention makes use of the enter-backward event that is generated based on this phone call.

Exemplary Mode Swap

Figure 4:
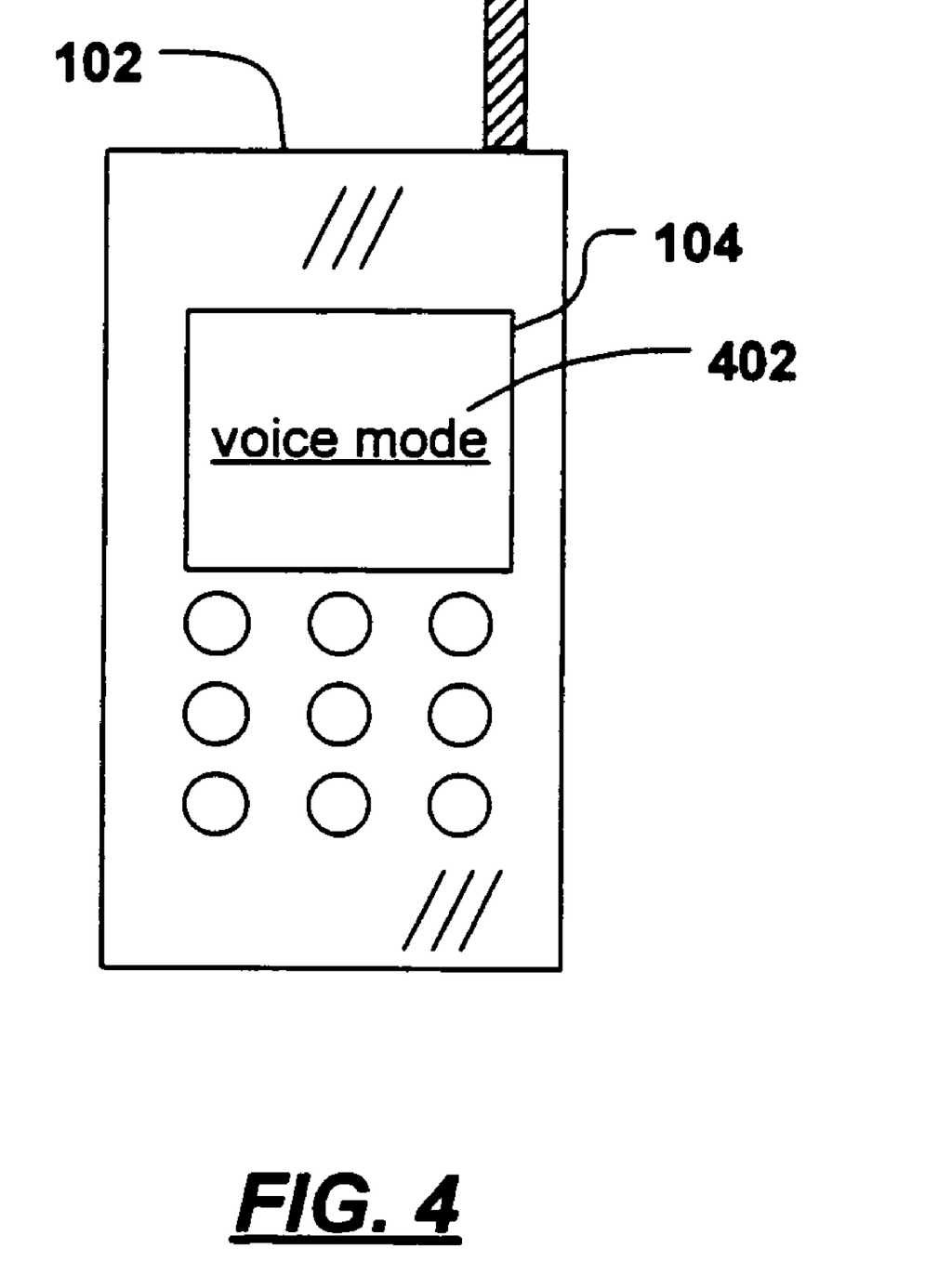
FIG. 4 is a block diagram of the telephone shown in FIG. 1, with the visual display of said telephone showing exemplary visual content including a link.

FIG. 4 shows an exemplary situation in which a "mode swap" may be performed. A "mode swap" is the name for what occurs when wireless telephone 102 changes from one mode of communication to another mode of communication (or from one combination of modes to another, in telephones that support the concurrent use of plural modes). For example, if wireless telephone is communicating in visual mode and then switches to voice mode, this switch is called a "mode swap."

In FIG. 4, an exemplary card is being displayed on display 104, and this card includes a link 402. Link 402 offers the user the chance to switch to voice mode by clicking the link. In the example of FIG. 4, this link represents an "explicit" mode swap—i.e., the user is explicitly requesting to change modes. However, there are other circumstances in which the mode swap may be "implicit." For example, a card could include a link that allow the user to listen to a song; listening to a song, obviously, must be performed in voice mode, and thus such a link would switch the user to voice mode, even though the user has not explicitly requested a mode swap.

Once in voice mode, the user may take some actions—e.g., interacting with voice menus, listening to a song, etc. At some subsequent point in time, the user may wish to return to visual mode. However, the state of the user's navigation may have been affected by what has occurred in voice mode—e.g., while in visual mode, the user may have navigated to a different card. If the visual browser simply "resumes" at the time the voice call is finished without an "update" as to where the user has navigated since visual-to-voice mode swap, then the visual browser will be pointed to the content that the user was browsing prior to changing to voice mode. This will be an inconvenience for the user, because it will appears to the user that everything he has done in voice mode has been "undone." In order for the transition to appear "seamless," the visual browser should be synchronized to the "state" that the user acquired in voice mode—e.g., the user should be pointed to the equivalent visual content that he reached while navigating in voice mode. The present invention provides a technique such that, upon a swap from one mode to another, the browsers can be synchronized without the user having to take action to initiate that synchronization.

A First Exemplary Process of Performing a Mode Swap With a Content Update

Figure 5:
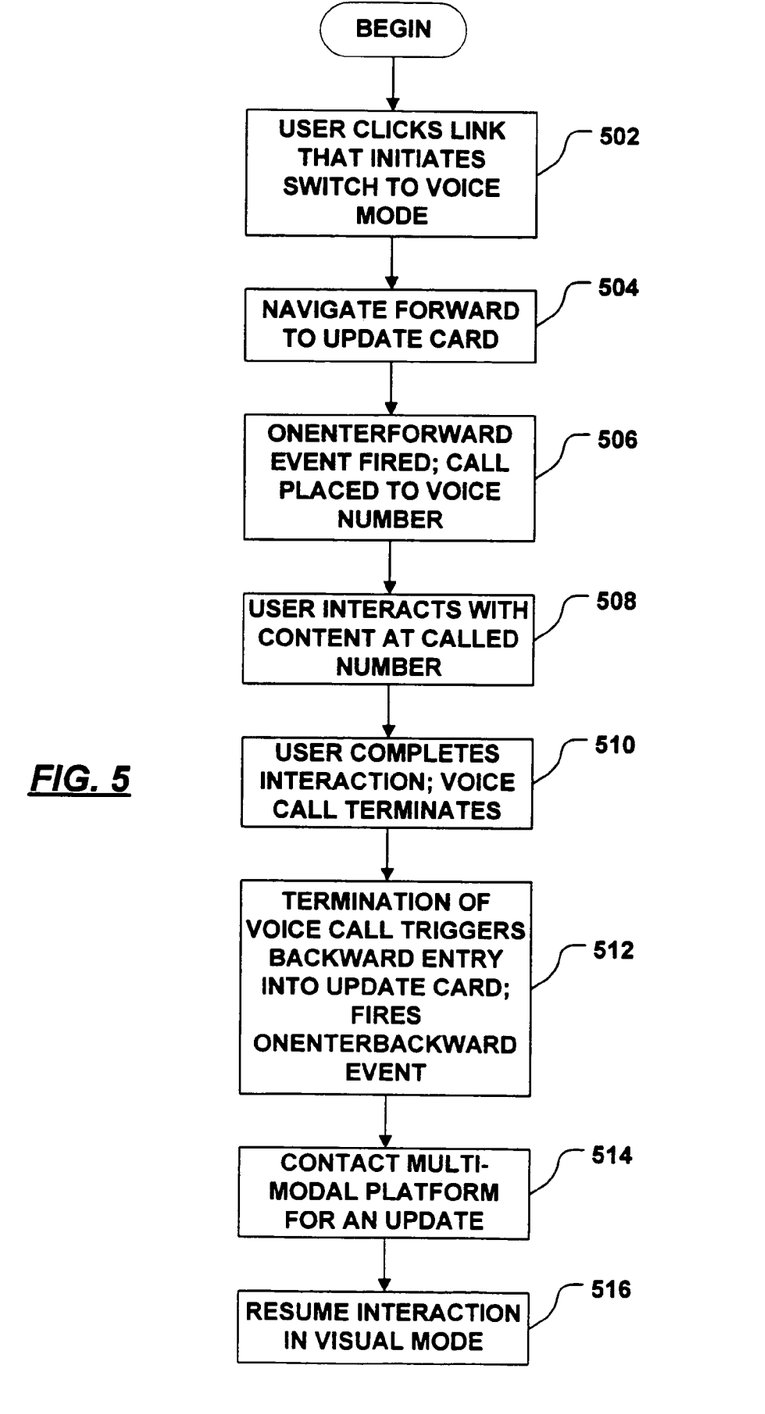
FIG. 5 is a flow diagram of a first exemplary process for mode swapping in accordance with aspects of the invention.

FIG. 5 shows a first exemplary process, whereby a user changes from one mode to another, and wherein the browsers that support the two modes (e.g., the visual and voice browsers) may be synchronized at the time of the mode change without the user having to take any action. (It should be noted that, on some newer phones, the user may be asked for confirmation by the device before a call is placed from the device (i.e., before following a WML link that would place a call), or before a WAP session is resumed, and they user may have to press a button to confirm. While a goal of the invention is to reduce or eliminate the need for user input at the time of a mode change, the invention still includes situations where the user may be required to press a button or take some other action—e.g., a wireless telephone that asks the user for confirmation before placing a voice call is still within the spirit and scope of the invention.) As noted above, most devices permit an instruction in a WML card to initiate a voice call, and treat the ending of the call as the backward reentry into the card from which the call was placed. The technique of FIG. 5 is adapted for such a device.

The process of FIG. 5 begins in visual mode—i.e., the user is using a visual browser (e.g., a WAP browser) to visually navigate some type of content. At some point during this navigation, a link appears that invites the user to change from visual mode to voice mode. One example of such a link is link 402 (shown in FIG. 4), which allows the user to explicitly request a change to voice mode. However, as discussed above, the link need not represent such an explicit request. As other example, the link may allow the user to consume content (e.g., a song) that necessarily implies a switch to voice mode. At step 502, the user clicks the link that initiates the switch to voice mode.

When the user clicks the aforementioned link, the link takes the user to another card called the "update card" (step 504). (In the specific content examples below, this "update card" is referred to as "_K_UPDATE".) In a preferred embodiment, the update card has been inserted into the visual content by multi-modal platform 116 (shown in FIG. 1)—i.e., the application 114 that generates the underlying content 122 need not generate, or even be aware of, the update card. Rather, in a preferred embodiment, multi-modal platform 116 creates this card as part of its function of facilitating multi-modal interaction with content.

The navigation to the update card is preferably performed using a GO HREF element. The GO HREF element preferably has a SETVAR child element that sets a variable called _K_PHONE to the actual phone number to make a voice call to. As discussed below in connection with step 506, when the voice call is actually placed, the visual browser preferably looks up the variable _K_PHONE, and places a call to whatever number is contained in that variable.

At step 506, the update card is entered. The entry is a forward entry into the update card. An event handler exists in the update card to handle the event of a forward entry, where the event handler causes a voice call to be placed. In WML, an ONEVENT handler is set up in the update card for the event ONENTERFORWARD. The action associated with the ONENTERFORWARD event is a GO HREF element with a WTAI link to place a phone call. Therefore, as soon as the browser enters this card, it places a phone call to the appropriate phone number (e.g., the number identified by _K_PHONE). Referring to the example of FIG. 1, the telephone number called may be a number associated with voice gateway 118, since, in that exemplary architecture, all content provided to wireless telephone 102 in voice mode is provided through voice gateway 118. However, it will be understood that the environment shown in FIG. 1 is merely exemplary, and the voice call placed at step 506 may be placed to any location without departing from the spirit and scope of the invention.

At this point, it should be noted that the placing of a voice call to the number identified by _K_PHONE provides sufficient information to synchronize a voice browser to an equivalent point in the navigation that has been reached by the visual browser. In a preferred embodiment of the invention, multi-modal platform 116 inserts the number(s) to call into the visual content, and knows where in the content the number(s) have been inserted. Thus, the fact that a call has been placed by a particular wireless telephone 102 to a particular telephone number provides sufficient information to deduce the point on the visual page to which the user has navigated. For example, suppose a voice call is initiated to the telephone number 555-1234, and multi-modal platform knows that this number is called only from a link contained on card #5 (e.g., card 205 in FIG. 2). Thus, the calling of this number indicates that the user has reached card #5. Moreover, multi-modal platform can determine the card from which the mode swap was initiated by using at least one different telephone number on each card. Thus, multi-modal platform has the opportunity to synchronize voice browser 119 to the state that had been reached by the visual browser, by using the information that is implied by the calling of a particular telephone number. (It should be noted that the name "update card" refers to the fact that it enables multi-modal platform 116 to "update" the state of one browser to the state of another.)

Returning to the flow chart of FIG. 5, at step 508, the user is in the voice call, and interacts with the content at the called number. For example, if the user was viewing a menu in visual mode at the time the change to voice mode is initiated, then step 508 may comprise the user listening to a menu contained on a VoiceXML page and responding to that menu in some fashion. On the other hand, if the user has clicked a link in order to listen to a song, then step 508 may comprise the user listening to that song. In general, the "interaction" that takes place at step 508 comprises the user either hearing some information in the form of audio, and/or providing some information in the form of audio.

At step 510, the user completes interaction with content in voice mode—i.e., the voice call to the number called at step 506 is terminated. For example, if the switch to voice mode was made in order to enable the user to listen to a song, then the provider of the song (e.g., voice gateway 118, shown in FIG. 1) may "hang up" when the song finishes.

The termination of the voice call returns wireless telephone 102 to visual mode, and triggers a backward entry into the update card. (As discussed above in connection with FIG. 3, when a voice call is placed from a card, termination of the call may (on some devices) be processed as a backward entry into the card that placed the call.) An event handler in the card is set up to take action upon this enter-backward event (step 512). Specifically, the event handler causes the visual browser to make a "hit" on a web site that provides information on the state of the user's navigation in voice mode (step 514). For example, if the user has moved (in voice mode) to a different page, the update site can inform the visual browser of where the user has navigated to in the voice content, so that the visual browser can load the appropriate card or page of visual content. In WML, an ONEVENT handler may be set up for the ONENTERBACKWARD event using a GO HREF element. The value of the HREF attribute is the URL for executing an update in the visual mode. For example, if a host called "MME_HOST" is adapted to provide update information to the visual browser, then the URL may be http://MME_HOST:MME_PORT/
controller?_k_task=update In a preferred embodiment, "MME_HOST" may be multimodal platform 116 (shown in FIG. 1). Whatever device serves as the MME_HOST, however, the above URL causes wireless telephone 102 to contact that device, and the MME_HOST responds with updated content. (An HTTP redirect may be involved in the process of sending back the response).

After receiving the update information, the user sees the updated content on the phone screen. The user may then continue interacting with the content in visual mode (step 516).

A Second Exemplary Process of Performing a Mode Swap With a Content Update

As noted above, the process of FIG. 5 relies on an enter-backward event to trigger a content update upon a change from voice to visual mode. This process relies on a particular feature of the visual browser—i.e., that when the visual browser places a call from a card, the visual browser reenters the card backward at the time that the phone call ends. However, not all visual browsers—not even all WAP browsers—work in this manner. For example, when some WAP browsers encounter an instruction to place a voice call, they spawn a new thread to place the call and, after the system is finished spawning the thread, the browser reenters the card backward. In other words, in such a browser, the backward reentry into the card from which the call is placed is triggered not by the ending of the call, but rather by the creation of the thread that initiates the call. If, in such a system, the update is activated by an enter-backward event, then one of two things will happen. Either: (1) the update host will be contacted before the voice call has even been placed; or (2) the voice call will be in progress before the update request can be executed, in which case the update request will simply "hang" since wireless telephones (usually) cannot communicate in both voice an visual modes at the same time. In scenario (2), the update will happen at the correct time (i.e., after the voice call has finished), but scenario (1) is more troublesome because the "update" will happen before any interaction in voice mode has occurred, and no update will happen after the voice call has actually finished. Since it is not possible to predict whether scenario (1) or scenario (2) will actually happen, a different approach from that described in FIG. 5 is indicated in devices whose visual browsers re-enter the update card backward immediately upon the spawning of a new thread.

Figure 6:
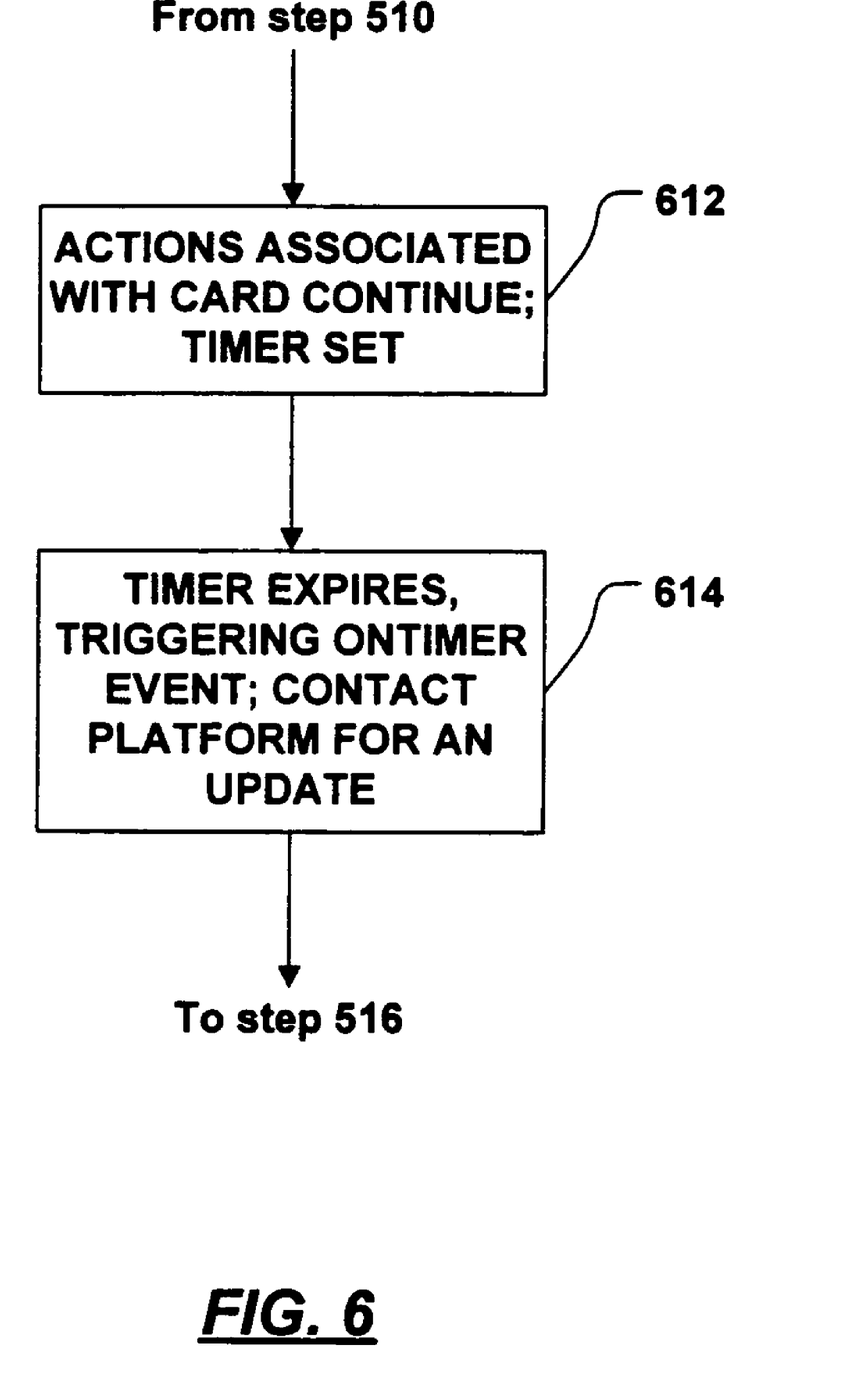
FIG. 6 is a flow diagram of a second exemplary process for mode swapping in accordance with aspects of the invention.

FIG. 6 shows a modified version of the process of FIG. 5, which allows an update to be triggered in a system that does not wait for completion of a voice call prior to re-entering the card from which the call was placed. The process of FIG. 6 uses expiration of a timer as the trigger to contact the update server.

The process of FIG. 6 is the same as the process of FIG. 5, up through step 510, with one exception: in the process of FIG. 5, the call to the update card (step 504) causes only the variable _K_PHONE to be set, whereas in the process of FIG. 6, navigation to the update card also causes a "clock" variable (e.g., "_K_CLOCK") to be set to a small value (e.g., 1). The clock variable is used in connection with a timer, as more particularly described below.

Following step 510 (see FIG. 5), the process of FIG. 6 continues to step 612. At step 612, a timer is set to expire at some time in the future. For example, the timer may be set to expire the number of seconds in the future represented by the clock variable. At step 614, the timer expires, thereby triggering an event. In the process of FIG. 6, the update card has an event handler for an ONTIMER event, which causes an action to be taken upon the expiration of the timer. The action associated with this ONTIMER event for the update card is a GO HREF element. As in FIG. 5, the value of the HREF attribute is the URL used to contact the host that will provide the update information—e.g., http://MME_HOST:MME_PORT/controller?_k_task=update. (Additionally, the event handler for the ONTIMER event preferably sets the value of __K_CLOCK to 0 so that the timer is disabled after it has served its purpose.) When the visual browser receives the update information from the update host (e.g., multimodal platform 116), it points the user to the correct card so that the user can continue browsing content at the appropriate place (as in step 516 of FIG. 5).

The reason for which the timer approach of FIG. 6 works is somewhat counterintuitive, and thus the following explanation is provided. Within an event handler, the instructions provided (e.g., the GO HREF instruction that initiates the voice call, and the instruction to initiate the timer) are executed sequentially. Thus, when the event handler for the enter-forward event is invoked, it first spawns a thread to place a voice call. After the thread has been spawned, the event handler proceeds to set the timer for a short time—e.g., one second. It would thus appear that the timer will expire in one second, and will contact the update site at that time regardless of whether the voice call has finished, but this is not the case. As noted above, many wireless devices cannot operate in both voice and visual modes at the same time; once the voice call has been placed, all operation in the visual browser is suspended. Thus, if the voice call has been initiated before the visual browser has the chance to initiate the timer, then the visual browser will be suspended, and the timer will not even be initiated until after the voice call has been completed. In that case, following the voice call the browser starts the timer, and the ONTIMER event handler that contacts the update site will be initiated one second later. On the other hand, if the visual browser sets the timer before the voice call is initiated, the visual browser will still "hang" as soon as the voice call has been placed, and it is very likely that the voice call will be placed before one second has elapsed. Thus, the timer will expire during the voice call, but the visual browser will be suspended during that call and will be unable to take action until after the voice call is complete. Once the voice call has finished, the ONTIMER event handler will be initiated (in response to the timer that expired during the voice call), and the update server will be contacted. In either case, the update server will be contacted after the voice call has been completed (as long as the wireless telephone can be relied upon to place the voice call before the timer expires—e.g., within one second of setting the timer).

It should be appreciated that either of the exemplary processes described above in FIGS. 5 and 6 has the advantage that the user's request for a mode swap (e.g., from a visual browser to a voice browser, or back) causes the new browser to be updated to the state of the old browser, without the user having to explicitly take action to request the update.

Exemplary WML Pages

The following are examples of WML web pages that support the technique of the present invention. Each of the web pages below includes an card of visual content (called the "welcome" card, in the examples below), which offers the user the opportunity to place a voice call by clicking a link. Additionally, each of the examples below includes an "update" card that updates the state of the visual browser when the voice call is complete. In the first example web page, the update is triggered by the backward entry into the update card upon completion of the voice call. In the second example, the update is triggered by the expiration of a timer.

The WML code for the first exemplary web page (the backward-entry approach) is:

```
<!DOCTYPE wml PUBLIC "-//WAPFORUM//DTD WML 1.3//EN"
"http://www.wapforum.org/DTD/wml13.dtd">
<wml>
<head>
<meta forua="true" http-equiv="Cache-Control" content="max-age=0"/>
<meta http-equiv="Cache-control" content="no-cache" forua="true"/>
<meta http-equiv="Cache-control" content="must-revalidate" forua="true"/>
</head>
<card id="p1" title="Welcome">
<do type="accept" label="Voice">
<go href="#___k_update">
<setvar name="___k_phone" value="0860076001"/>
</go>
</do>
<do type="options" label="Back">
<prev/>
</do>
<p>
<b>Welcome.</b><br/>
This is the <b>initial page</b>. Click on <b>Voice</b> to place a voice call.
When you are done with the voice call, you should automatically see the
<a href="page2.jsp">Updated Page</a>.
</p>
</card>
<card id="___k_update" title="Update">
<onevent type="onenterforward">
<go href="wtai://wp/mc;$(___k_phone)"/>
</onevent>
<onevent type="onenterbackward">
<go href="http://MME_HOST:MME_PORT/controller?___k_task=update"/>
</onevent>
</card>
</wml>
```

The WML code for the second exemplary web page (the timer approach) is:

```
<?xml version="1.0"?>
<!DOCTYPE wml PUBLIC "-//WAPFORUM//DTD WML 1.3//EN"
"http://www.wapforum.org/DTD/wml13.dtd">
<wml>
<head>
<meta forua="true" http-equiv="Cache-Control" content="max-age=0"/>
<meta http-equiv="Cache-control" content="no-cache" forua="true"/>
<meta http-equiv="Cache-control" content="must-revalidate" forua="true"/>
</head>
<card id="p1" title="Welcome">
<do type="accept" label="Voice">
<go href="#___k_update">
<setvar name="___k_phone" value="0145294011"/>
</go>
</do>
<do type="options" label="Back">
<prev/>
</do>
```

-continued

```
<p>
<b>Welcome.</b><br/>
This is the <b>initial page</b>. Click on <b>Voice</b> to place a voice call.
When you are done with the voice call, you should automatically see the
<a href="page2.jsp">Updated Page</a>.
</p>
</card>
<card id="___k__update" title="Update">
<onevent type="onenterforward">
<go href="wtai://wp/mc;$(___k__phone)">
<setvar name="clock" value="1"/>
</go>
</onevent>
<onevent type="ontimer">
<go href="http://MME__HOST:MME__PORT/controller?___k__task=update">
<setvar name="clock" value="0"/>
</go>
</onevent>
<timer value="$(clock)"/>
<do type="accept" label="Update">
<go href="page2.jsp"/>
</do>
<do type="options" label="Back">
<prev/>
</do>
<p>
Update text.
</p>
</card>
</wml>
```

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of switching between a voice mode of a voice browser and a visual mode of a visual browser in a device operated by a user, wherein only one of said voice mode and visual mode is operable at any point in time on said device, said method comprising the steps of:
   clicking a link on a first visual card in said visual browser by said user,
   wherein said clicking initiates a switch from the visual mode of the visual browser to the voice mode of the voice browser;
   navigating forward to an update card, wherein said step of navigating forward to said update card constitutes a forward entry into the update card;
   wherein said forward entry initiates a forward event handler for;
      placing a voice call to a phone number, and terminating the visual browser;
      contacting an update host;
      receiving from said update host, information indicative of content of the visual browser;
      updating the state of said voice call to the state of the visual browser when the user clicked;
      interacting with content of an application at said called phone number;
   terminating the voice call, wherein said termination initiates a switch from the voice mode of the visual browser;
   wherein said termination of the voice call creates a backward entry to the update card and wherein said backward entry initiates a backward event handler for;
      contacting said update host and receiving information indicative of said interaction with said content of the voice browser;
      updating the state of the visual browser, in accordance with said information received, to the state of the voice call when the voice call terminated, and
      resuming interaction in visual mode with the user.

2. A method of swapping between a voice mode of a voice browser and visual mode of a visual browser in a device operated by a user, wherein only one of said voice mode and visual mode is operable at any point in time on said device, said method comprising the steps of:
   clicking a link on a first visual card in said visual browser by said user,
   wherein said clicking initiates a switch from the visual mode to the voice mode;
   navigating forward to an update card, wherein said step of navigating forward to said update card constitutes a forward entry into update card;
   wherein said forward entry initiates a forward event handler that performs the functions of;
      placing a voice call to a phone number and terminating the visual browser;

contacting an update host and updating the state of said voice call to the state of the visual browser when the user clicked;

interacting with content of an application at said called phone number;

actuating a backward event handler upon expiration of a timer, further comprising the steps of:

starting said timer, set to expire a predetermined amount of time in the future; and after said predetermined amount of time, determining that said timer has expired, contacting said update host and receiving information indicative of said interaction with said content of the voice browser; and updating the state of the visual browser to the state of the voice call, in accordance with said information received, terminating the voice browser and resuming interaction in visual mode with the user.

3. The method of claim 1, wherein said second visual card comprises, an event handler which is actuated upon forward entry into said second visual card, and wherein said act of initiating a voice call is performed by said event handler.

4. The method of claim 1, wherein said update host provides an indication of a page and card to which said visual browser should be pointed.

5. The method of claim 4, further comprising:

loading said page prior to pointing the visual browser to said card.

6. A computer-readable medium having instructions encoded thereon which is interpretable by a browser, wherein the instructions provide for switching between a voice mode of a voice browser and a visual mode of a visual browser in a device operated by a user, wherein only one of said voice mode and visual mode is operable at any point in time on said device, said method comprising the steps of:

clicking a link on a first visual card in said visual browser by said user, wherein said clicking initiates a switch from the visual mode of the visual browser to the voice mode of the voice browser;

navigating forward to an update card, wherein said step of navigating forward to said update card constitutes a forward entry into said update card;

wherein said forward entry initiates a forward event handler for placing a voice call to a phone number, and terminating the visual browser;

contacting an update host;

receiving from said update host, information indicative of content of the visual browser;

updating the state of said voice call to the state of the visual browser when the user clicked;

terminating the voice call, wherein said termination initiates a switch from the voice mode of the voice browser to the visual mode of the visual browser;

wherein said termination of the voice call creates a backward entry to the update card and wherein said backward entry initiates a backward event handler for contacting said update host and receiving information indicative of said interaction with said content of the voice browser;

updating the state of the visual browser, in accordance with said information received, to the state of the voice call when the voice call terminated, and resuming interaction in visual mode with the user.

7. The computer-readable medium of claim 6, wherein said forward event handler is adapted to initiate a timer following initiation of said voice call, and wherein said backward event handler is actuatable by an expiration of said timer.

8. The computer-readable medium of claim 7, wherein said forward event handler sets said timer to expire at a future point in time indicated by a variable, and wherein an action associated with said link sets said variable.

9. The computer-readable medium of claim 7, wherein said browsers are adapted to create a new thread for placement of said voice call, and wherein said browsers continue instructions contained in the data following creation of said new thread regardless of whether said voice call has been completed.

10. The computer-readable medium of claim 6, wherein the browsers are WAP browsers, and the instructions are in the form of Wireless Markup Language (WML).

11. The computer-readable medium of claim 6, wherein said forward event handler comprises an instruction to place said voice call to a number specified within a variable, and wherein an action associated with said link comprises the setting of said variable to a telephone number.

12. The method of claim 1, wherein said update host maintains state information of the visual browser and voice browser.

13. The method of claim 1, wherein said update card is created by said update host.

14. The method of claim 1, wherein said update host inserts phone numbers into first visual card, and stores information on the location of said phone numbers in cards within the visual browser, and utilizes location information to deduce state information of the visual browser.

15. The method of claim 1, wherein said user actuates the backward entry by inputting a command into a user interface of the device.

* * * * *